United States Patent [19]

Cartwright

[11] 4,249,301
[45] Feb. 10, 1981

[54] METHODS FOR MANUFACTURING MAGNETIC TRANSDUCING HEADS

[75] Inventor: John R. Cartwright, Letchworth, England

[73] Assignee: Data Recording Instrument Company Limited, Staines, England

[21] Appl. No.: 65,616

[22] Filed: Aug. 10, 1979

[30] Foreign Application Priority Data

Aug. 23, 1978 [GB] United Kingdom ............... 34291/78

[51] Int. Cl.³ .............................................. G11B 5/42
[52] U.S. Cl. ................................................... 29/603
[58] Field of Search ................... 29/603; 360/119–121

[56] References Cited

U.S. PATENT DOCUMENTS 4,045,864  9/1977  Morokuma et al. ................... 29/603

Primary Examiner—Carl E. Hall
Attorney, Agent, or Firm—Hane, Roberts, Spiecens & Cohen

[57] ABSTRACT

A method of forming a magnetic ferrite element for the core of a magnetic transducing head is disclosed in which spacers for determining the length of a non-magnetic gap are formed by providing a masking layer at locations on a surface of the element at which the spacers are required and eroding away the masking layer and the unmasked portions of the surface by an ion beam to produce a new surface having a spacer projecting at each of the locations by a distance determined by the relative rates of erosion of the ferrite and the masking material and by the predetermined thickness of the masking layer.

9 Claims, 5 Drawing Figures

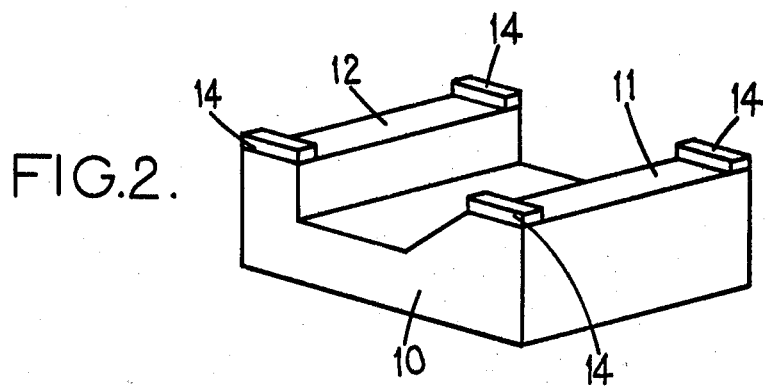
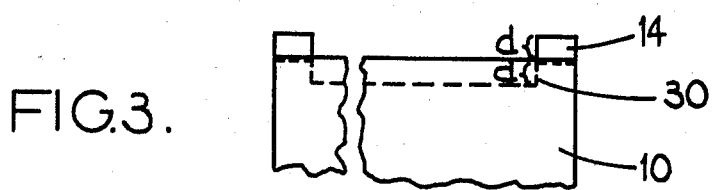
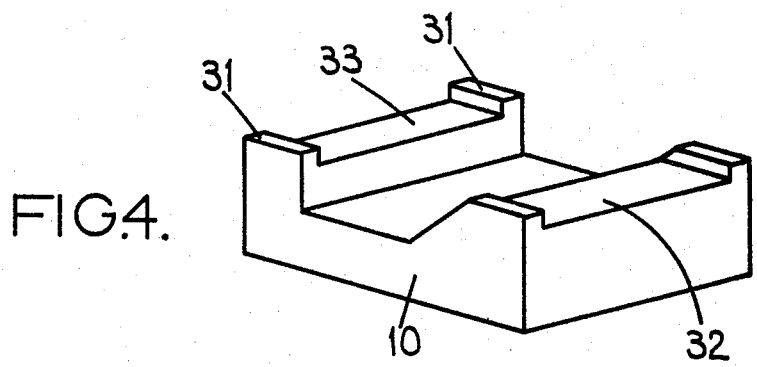

METHODS FOR MANUFACTURING MAGNETIC TRANSDUCING HEADS

BACKGROUND OF THE INVENTION

This invention relates to magnetic transducing heads and in particular to a method of manufacturing magnetic cores for magnetic transducing heads.

The cores of magnetic transducing heads are often formed of ferrite magnetic elements which are bonded together by a non-magnetic material, such as glass, in such a manner that there is a non-magnetic gap between the ferrite elements. The gap is usually filled by the non-magnetic bonding material in order to reinforce the edges of the ferrite members and to prevent the ingress of foreign matter into the gap. In use of the magnetic head, the gap co-operates with a magnetic record medium for recording data onto the medium and/or for reading data recorded on the medium.

In the manufacture of such cores, two magnetic members, both of which may be of channel section or one of channel section and the other of rectangular section, are lapped to provide planar polished gap defining surfaces. Spacers are deposited on the gap defining surface or surfaces of one of the members and the members are assembled with their respective gap defining surfaces in confronting relationship and spaced apart by the spacers. Pressure is applied to the members to maintain them in this position so that the gap between the gap defining surfaces is determined by the spacers. Glass in the form of powder is applied as a slurry adjacent the gap and the assembly is heated to a temperature sufficiently high to cause the glass to flow and to enter and fill the gap between the gap defining surfaces. When the assembly has cooled, the glass bonds the magnetic members together. Generally the magnetic members are larger than the thickness of the required cores and therefore the assembly is cut into a number of slices to provide a plurality of cores, those slices containing the spacers being discarded.

The operating characteristics and performance of a magnetic transducing head depends upon the dimensions of the non-magnetic gap in the magnetic core and particularly upon the length of the gap. In the case of magnetic heads intended for operation with very high frequency signals the length of the gap may be of the order of 0.00005 inches and hence very small variations in the length of the gap can represent a large percentage change and hence result in a change in the characteristics of the head incorporating the core such that the head characteristics are outside the acceptable tolerance limits.

Generally the spacers for setting the length of the non-magnetic gap have been formed of metal such as copper or gold deposited at each end of the gap defining faces of one of the magnetic members. This has been satisfactory when using a relatively soft glass for bonding and filling the gap between the members because such glass flows at a relatively low temperature. However it is desirable to use a glass, for filling the gap, which has a resistance to wear which is more nearly comparable with the resistance to wear of the ferrite of which the magnetic members are formed. Therefore it is required to use a harder glass and such glasses require a much higher temperature to cause their viscosity to be reduced to a value at which the glass will flow into and fill the gap without the formation of voids in the glass filling. It has been found that at the higher temperatures necessitated by the glass, the conventional spacers tend to deform with the result that the length of the gap cannot be determined with sufficient accuracy by the spacers of metal.

SUMMARY OF THE INVENTION

According to the invention a method of manufacturing a magnetic core for a magnetic transducing head includes the steps of providing a first magnetic member of ferrite material with a first planar surface; providing a layer of masking material having a predetermined thickness at each of two spaced apart positions on the first planar surface leaving a portion of the planar surface exposed; subjecting the exposed portion of the planar surface and the masking layers to an eroding action by an ion beam to remove material from the surface of the masking layers and from the exposed portion of the planar surface to produce a new planar surface on the first magnetic member and a spacer at each of said positions projecting from said new planar surface consisting at least partly of the ferrite material of the first magnetic member, the height of the spacers being determined by the relative rates of erosion of the ferrite material and masking material and by the predetermined thickness of the layer of masking material; then assembling the first magnetic member with a second magnetic member utilising the spacers to form a non-magnetic gap between the first and second members; bonding the members together with a glass material which fills the non-magnetic gap between the members and machining the assembly to remove the spacers.

Preferably the eroding action by ion beam is continued at least until all the masking material has been removed. The masking material may have a rate of erosion substantially equal to that of the ferrite material of the first magnetic member and if desired the layer of masking material may be of ferrite material sputtered onto the first magnetic member through apertures in a shield.

The bonded members may be cut into a plurality of slices, each slice consisting of a portion of the first and of the second member bonded together by the glass in the gap between the portions, each slice providing a magnetic core or a pair of pole pieces of a magnetic core.

BRIEF DESCRIPTION OF DRAWINGS

A method of carrying out the invention will now be described with reference to the accompanying drawings in which:

FIG. 1 shows a magnetic member after deposition of spacers with the shield shown broken away and FIG. 2 shows a magnetic member after deposition of ferrite to produce a profile on the faces of the member FIG. 3 is a view, to an enlarged scale of a part of FIG. 2 indicating the extent to which the member will be machined by ion beam FIG. 4 is a view of the member after machining and FIG. 5 shows the member of FIG. 4 glass bonded to a further magnetic member.

DESCRIPTION OF PREFERRED EMBODIMENT

Figure 1:
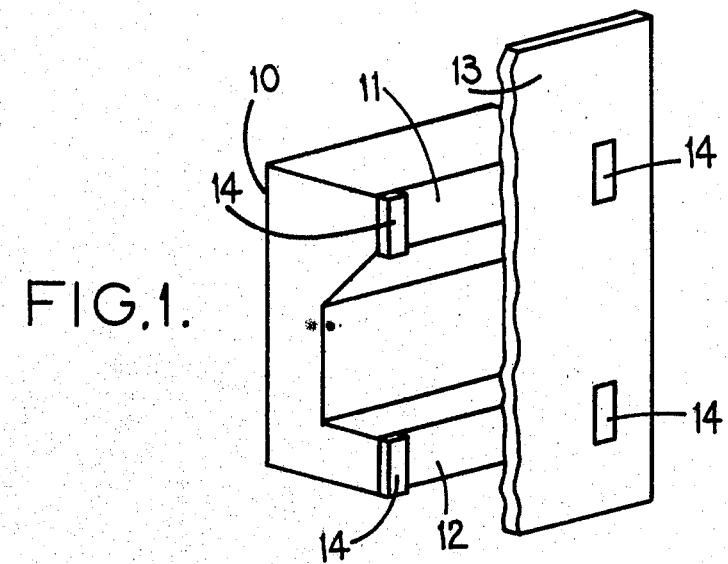
Figure 5:
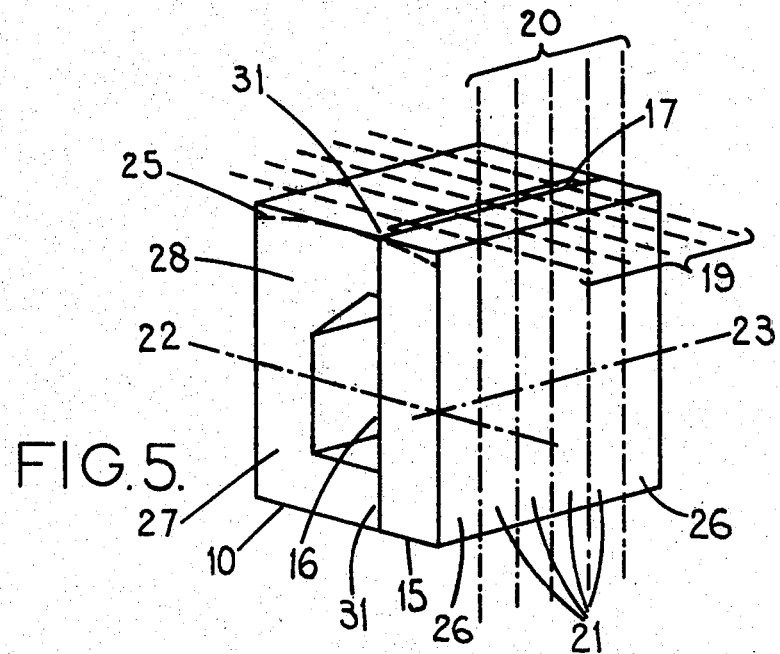

Referring first to FIG. 1, a first magnetic member 10 of ferrite material of channel shaped section is lapped and polished on its faces 11, 12 to provide accurately co-planar plane surfaces. A shield 13 is laid over each of these faces 11, 12 which leaves at each end of the faces 11, 12, rectangular areas exposed. The shield may be formed of aluminium foil approximately 0.002 to 0.006 inches thick. The magnetic member 10, with the shield 13 thereon, is placed in an ion beam sputtering apparatus and is placed on the work holder of the apparatus. Ferrite material is placed on the target of the apparatus. The sputtering apparatus is then operated to deposit ferrite onto the magnetic member 10. Due to the shield 13, ferrite 14 is deposited only on the exposed rectangular areas of the faces 11, 12.

The sputtering causes a layer of ferrite to be deposited which is of uniform thickness, the thickness of the layer being dependent inter alia upon the period for which sputtering is contained. After a period which will provide the required thickness of ferrite, the sputtering is terminated and the magnetic member 10 is removed from the apparatus.

The shield 13 is removed thereby leaving the deposited ferrite 14 projecting from the faces 11, 12 and hence the faces 11, 12 have profiles of the form shown in FIG. 2.

The member 10 is replaced in the ion beam sputtering equipment but this time the member 10 is placed on the target. On operation of the equipment the ion beam erodes material from the ferrite projections 14 and from the exposed areas of the faces 11, 12 not covered by the projections 14. It is a feature of ion beam erosion that the erosion is substantially uniform over a surface of uniform material. Hence the projections 14 are uniformly eroded and also the exposed areas of the faces 11, 12 are uniformly eroded. If the material of the faces 11, 12 has a rate of erosion equal to that of the material of the projections 14, the faces 11, 12 and the projections 14 are eroded to the same extent. Hence at any instant in time during the erosion process, the initial profile of the faces 11, 12 with the projections 14 is maintained and is merely displaced relative to the member 10. If the erosion process is continued for a sufficient period, the projections 14 will be entirely removed and the new profile, identical with the initial profile, will be wholly formed on the member 10 as shown by the dotted line 30 in FIG. 3. The member 10, after such erosion, is shown in FIG. 4. It will be seen that the member 10 has new planar faces 32, 33 and at each end thereof are spacers 31 projecting from the plane of the faces 32, 33 by a distance 'd' equal to the thickness 'd' of the projections 14 initially deposited on the member 10. Hence the height of the spacers 31 is determined solely by the thickness of the deposited projections 14 and is wholly independent of the period for which the erosion is carried out irrespective of whether the projections are partially or wholly removed by the erosion.

If desired, the projections 14 may be of material different from that of the member 10 and further may be of material having a different rate of erosion from that of the ferrite material forming the member 10. Also the projections 14 may be formed by methods other than by sputtering as described above. For example the projections 14 may be formed of stainless steel shims bonded onto the ferrite member 10 by epoxy resin. Erosion is continued at least until the projections 14 have been removed, thus the height of the spacers 31 is dependent not only upon the initial height of the projections 14 by also upon the differential rates of erosion of the two materials. However the height obtained is independent of the precise period for which erosion takes place. Alternatively if it is desired to provide spacers 31 which are a composite of the material of the member 10 and of the material from which the projections 14 are formed, erosion is terminated prior to total removal of all projections 14. In this case the final height of the spacers 31 is, in addition, dependent upon the ratio of thickness of the materials forming the spacers 31.

The member 10 is then assembled with a second member 15 which has a lapped and polished face 16, the face 16 abutting against the ferrite spacers 31. Thus the spacers 31 act as spacers between the face 16 of the member 15 and the faces 11 and 12 of the member 10 to define non-magnetic gaps 17 between the members 10, 15. The two magnetic member 10, 15 are held together by the application of a small pressure exerted by a spring clip.

Glass in the form of powder mixed with a suitable liquid such as water to form a slurry is applied adjacent the non-magnetic gaps 17. After drying the slurry, the assembly is heated in an oven to cause the glass to melt and flow into the non-magnetic gaps 17. The temperature to which the assembly is heated is sufficiently high to ensure that the viscosity of the glass is sufficiently low to enable the glass to flow in the gap and permit any occluded gas bubbles to move through the glass out of the region of the gap.

The glass used for bonding and filling the gap may be of such composition that the assembly would need to be heated to 1000° C.

After cooling of the bonded assembly, the assembly is cut along a plurality of planes indicated by lines 19, 20 (FIG. 2) to produce a plurality of individual magnetic cores 21 and the end slices 26 containing the spacer 14 are discarded.

If it is desired to produce pairs of pole pieces, then, prior to cutting the assembly along the planes indicated by lines 19, 20 the assembly is cut in an othogonal plane indicated by lines 22, 23. The lower part 27 of the assembly may be discarded, the upper part 28 with the glass filled gap being divided along the lines 19, 20 into individual pairs of pole pieces. Prior to dividing the assembly, the upper surface 24 is machined to a suitable profile, indicated by line 25, for co-operation with a record medium. If desired, the member 10 may be symmetrical and the assembly may be divided into two identical parts 27, 28, each of which is utilised for the production of pairs of pole pieces. When both parts 27 and 28 are to be used for the production of pairs of pole pieces, both the upper and the lower surfaces are machined to the required profile.

Additional spacers may be provided intermediate the spacers 31 to prevent bowing of the ferrite members and thereby ensure that the non-magnetic gap is of uniform dimension throughout the length of the assembly.

When only the upper part 27 of the assembly is to be used for producing pairs of pole pieces, it is not necessary to form the spacers 31 on the face 33.

I claim:
1. A method of manufacturing a magnetic core for a magnetic transducing head including the steps of providing a first magnetic member of ferrite material with a first planar surface; providing a layer of masking material having a predetermined thickness at each of two spaced apart positions on the first planar surface leaving a portion of the planar surface exposed; subjecting the exposed portion of the planar surface and the masking layers to an eroding action by an ion beam to remove material from the surface of the masking layers and from the exposed portion of the planar surface to produce a new planar surface on the first magnetic member and a spacer at each of said positions projecting from said new planar surface consisting at least partly of the ferrite material of the first magnetic member, the height of the spacers being determined by the relative rates of erosion of the ferrite material and masking material and by the predetermined thickness of the layer of masking material; then assembling the first magnetic member with a second magnetic member utilising the spacers to form a non-magnetic gap between the first and second members; bonding the members together with a glass material which fills the non-magnetic gap between the members and machining the assembly to remove the spacers.

2. A method as claimed in claim 1, in which the masking material has a rate of erosion substantially equal to that of the ferrite material of the first magnetic member.

3. A method as claimed in claim 1, in which the masking material has a rate of erosion different to that of the ferrite material of the first magnetic member.

4. A method as claimed in claim 2, in which the eroding action by the ion beam is continued at least until all the masking material has been removed.

5. A method as claimed in claim 3, in which the eroding action by the ion beam is continued at least until all the masking material has been removed.

6. A method claimed in claim 1 in which the masking material is sputtered on to the first magnetic member through apertures in a shield.

7. A method as claimed in claim 1 in which the masking material is provided at each position by a metal shim bonded on to the first magnetic member.

8. A method as claimed in claim 1 in which the glass material utilised in bonding the members together is a glass-ceramic material in its glass phase.

9. A method as claimed in claim 1 in which after bonding the members together, the bonded members are cut into a plurality of slices, each slice consisting of a portion of the first and of the second member bonded together by the glass in the gap between the portions, each slice providing a magnetic structure for use in a magnetic transducing head.

* * * * *